United States Patent
Garetto et al.

(10) Patent No.: US 10,684,151 B2
(45) Date of Patent: Jun. 16, 2020

(54) METHOD AND APPARATUS FOR CONTROLLING THE SUPPLY OF A LEVEL OF A LIQUID CONTAINED IN A VESSEL

(71) Applicant: ELBI INTERNATIONAL SPA, Turin (IT)

(72) Inventors: Luca Garetto, Rivoli (IT); Paolo Ravedati, Moncalieri (IT); Ezio Giberti, Turin (IT)

(73) Assignee: ELBI INTERNATIONAL SPA, Turin (IT)

( * ) Notice: Subject to any disclaimer, the term of this patent is extended or adjusted under 35 U.S.C. 154(b) by 0 days.

(21) Appl. No.: 16/312,129

(22) PCT Filed: Jun. 21, 2017

(86) PCT No.: PCT/IB2017/053686
§ 371 (c)(1),
(2) Date: Dec. 20, 2018

(87) PCT Pub. No.: WO2017/221164
PCT Pub. Date: Dec. 28, 2017

(65) Prior Publication Data
US 2019/0234783 A1    Aug. 1, 2019

(30) Foreign Application Priority Data

Jun. 23, 2016  (IT) .................. 102016000065402

(51) Int. Cl.
*G01F 1/74* (2006.01)
*D06F 39/08* (2006.01)
(Continued)

(52) U.S. Cl.
CPC .............. *G01F 1/74* (2013.01); *D06F 39/087* (2013.01); *G01F 15/0755* (2013.01);
(Continued)

(58) Field of Classification Search
None
See application file for complete search history.

(56) References Cited

U.S. PATENT DOCUMENTS

| | | |
|---|---|---|
| 3,935,876 A | 2/1976 | Massie et al. |
| 5,245,946 A | 9/1993 | Hoefelmayr et al. |
| (Continued) | | |

FOREIGN PATENT DOCUMENTS

| | | |
|---|---|---|
| CA | 2594500 A1 | 8/2006 |
| JP | 6-72494 A | 3/1994 |
| JP | 2011-045433 A | 3/2011 |

OTHER PUBLICATIONS

International Search Report and Written Opinion from International Application No. PCT/IB2017/053686, dated Oct. 24, 2017.

*Primary Examiner* — Harshad R Patel
(74) *Attorney, Agent, or Firm* — Merchant & Gould P.C.

(57) ABSTRACT

A method includes actuating a pump at a constant nominal flow-rate to induce liquid flow out of a vessel through an outlet duct. The outlet duct communicates with the vessel with an upper aperture at an intermediate level height, and a lower aperture at a reduced level height. Flow of liquid is detected in the outlet duct. A digital signal assumes an alternate sequence of states when the liquid level is between the intermediate and reduced levels. Each state is an air-indicating state or liquid-indicating state. The presence or absence of air bubbles is detected in the flow of liquid. The digital signal is compared with a reference signal having a predetermined sequence of air-indicating states and liquid-indicating states. Pump actuation duration is modified as a function of a difference between the digital and reference signals. An apparatus is controls the supply of a liquid level in a vessel.

11 Claims, 4 Drawing Sheets

(51) Int. Cl.
*G01F 15/075* (2006.01)
*G01F 23/00* (2006.01)
*A47L 15/42* (2006.01)

(52) U.S. Cl.
CPC ...... *G01F 23/0061* (2013.01); *A47L 15/4223* (2013.01); *A47L 15/4244* (2013.01); *A47L 2401/09* (2013.01); *A47L 2501/05* (2013.01); *D06F 39/083* (2013.01)

(56) References Cited

U.S. PATENT DOCUMENTS 5,313,964 A 5/1994 Dausch et al.
8,322,571 B2 12/2012 Hovinen et al.

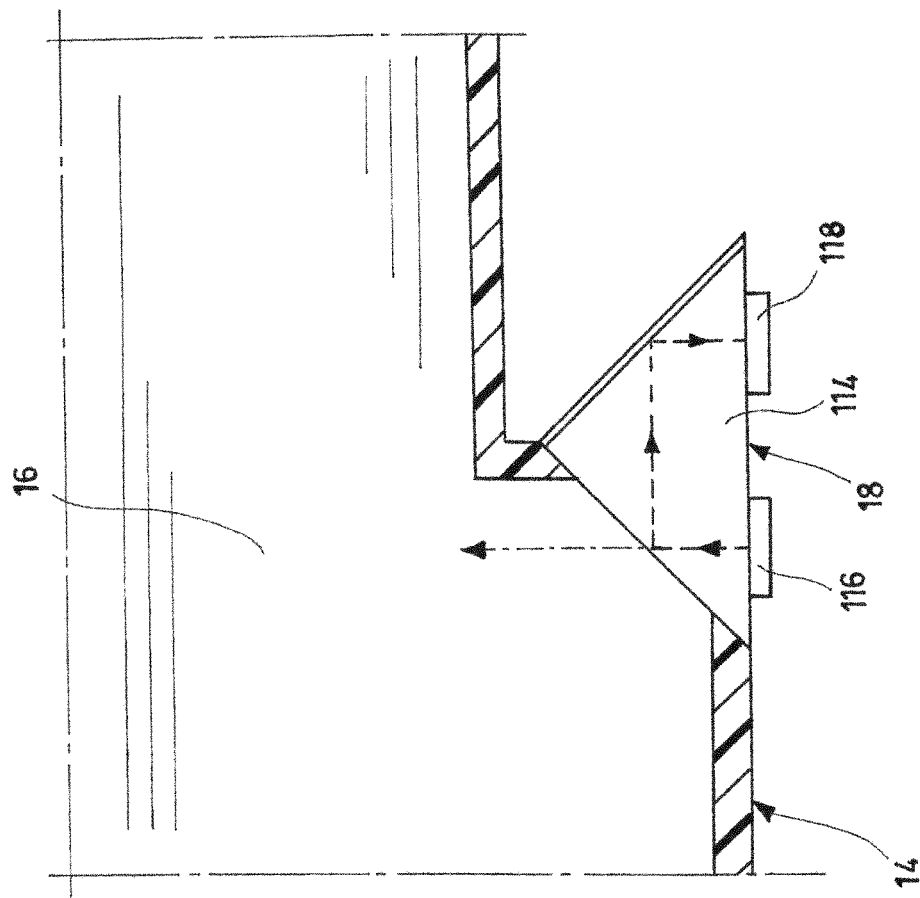

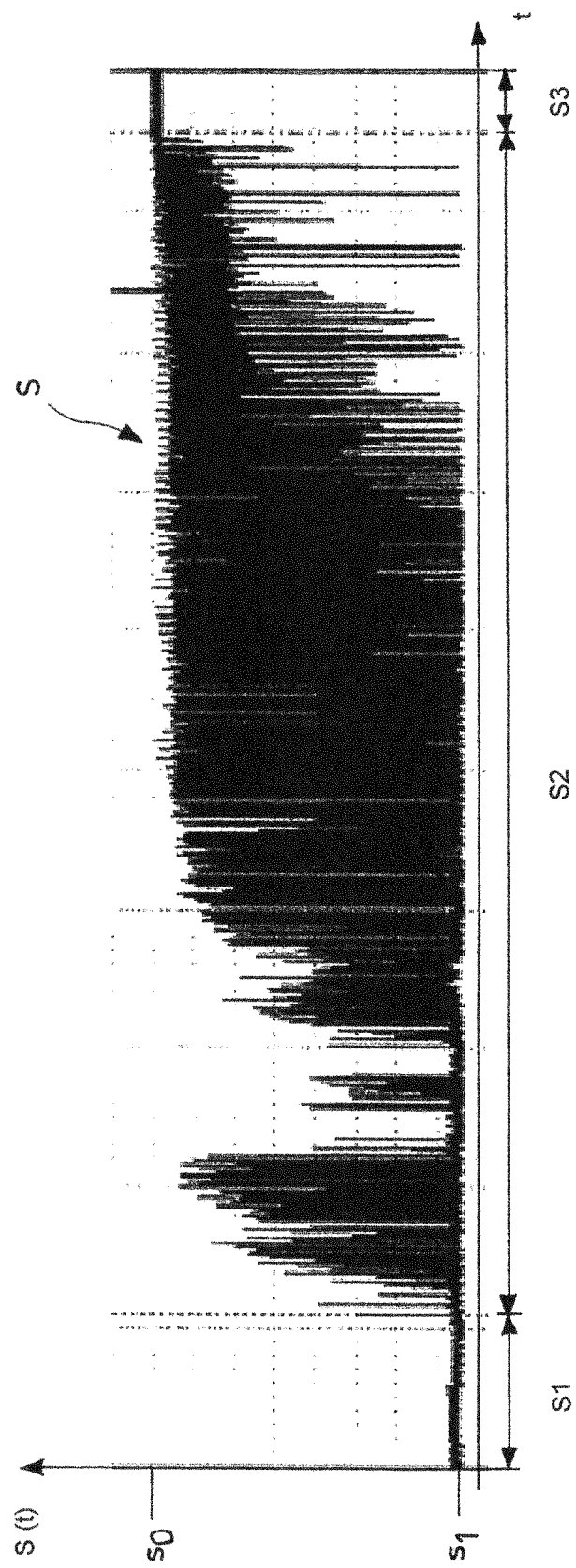

METHOD AND APPARATUS FOR CONTROLLING THE SUPPLY OF A LEVEL OF A LIQUID CONTAINED IN A VESSEL

This application is a National Stage Application of International Application No. PCT/IB2017/053686, filed 21 Jun. 2017, which claims benefit of Serial No. 102016000065402, filed 23 Jun. 2016 in Italy and which applications are incorporated herein by reference. To the extent appropriate, a claim of priority is made to each of the above-disclosed applications.

TECHNICAL FIELD

The present invention relates to a method and an apparatus for controlling the supply of a level of liquid contained in a vessel.

BACKGROUND ART

In the industry, methods and apparatuses are generally known for detecting the level of a liquid contained in a vessel.

Such methods and apparatuses find application in numerous technical fields and sectors. By way of non-limiting example, such methods and apparatuses are generally employed in the field of electric systems for household machines, particularly washing machines such as laundry washing machines and dishwashers.

However, the methods and apparatuses currently known in the art suffer from some drawbacks that the present invention is meant to overcome.

SUMMARY OF THE INVENTION

It is one object of the present invention to provide a method and an apparatus that are reliable and that can be implemented in a simple and economical manner.

According to the present invention, this and other objects are achieved through a method and apparatus.

It is to be understood that the appended claims are an integral part of the technical teachings provided in the following detailed description of the invention.

Further features and advantages of the present invention will become apparent from the following detailed description, which is supplied by way of non-limiting example with particular reference to the annexed drawings, which will be summarized below.

BRIEF DESCRIPTION OF THE DRAWINGS

FIG. 3 is a schematic partial view of a digital sensor that can be used in a detection section of the apparatuses shown in FIGS. 1, 2 and 2a.

FIG. 4 is a Cartesian-axis graph relating to the time trend of the signals provided by a digital sensor incorporated into an apparatus made in accordance with an illustrative embodiment of the present invention.

DETAILED DESCRIPTION OF THE INVENTION

Figure 1:
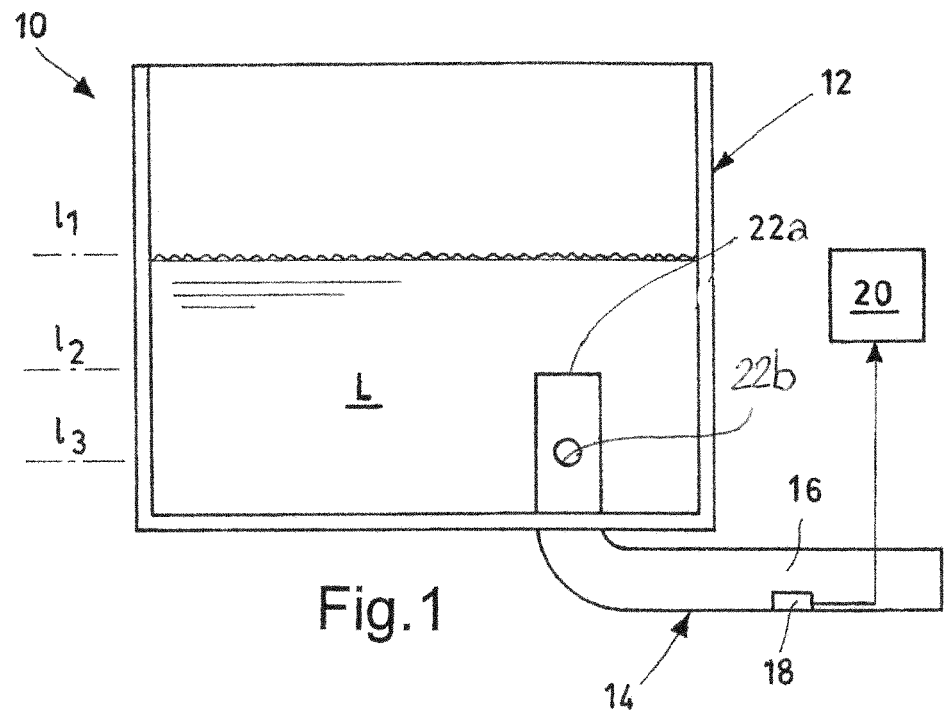
FIGS. 1, 2 and 2a are schematic views of apparatuses, each one of them being made in accordance with a respective illustrative embodiment of the present invention. The apparatuses shown in these drawings are configured for detecting the level of a liquid contained in a vessel.

With particular reference to FIG. 1, numeral 10 designates as a whole an apparatus made in accordance with an illustrative embodiment of the present invention.

As will be described more in detail below, the apparatus 10 is configured for detecting the level of a liquid contained in a vessel. As will become apparent to those skilled in the art from the following detailed description, the apparatus 10 is suitable for application in numerous technical fields and sectors. By way of non-limiting example, the apparatus 10 is generally employed in the field of electric systems for household machines, in particular washing machines such as laundry washing machines and dishwashers.

The apparatus 10 comprises a vessel 12 that can contain a quantity of liquid L. For example, the vessel 12 may be a tank for a liquid, such as a washing or rinsing agent of a washing machine.

The apparatus 10 comprises also an outlet duct 14 that extends from the vessel 12 and includes a detection section 16.

In addition, the apparatus 10 comprises a pump that can be actuated at a constant nominal flow-rate in order to induce a flow of liquid out of the vessel 12 through the outlet duct 14. By way of example, the pump is situated downstream of the outlet duct 14.

The outlet duct 14 communicates with the vessel 12 with an upper aperture 22a, situated at a height that defines an intermediate level 12 of filling of the vessel 12. Also, the outlet duct 14 communicates with the vessel 12 with a lower aperture 22b, situated at a height that defines a reduced level 13 of filling of said vessel 12. The reduced level 13 is lower than the intermediate level 12.

Furthermore, the apparatus 10 includes a digital sensor 18 at least partially facing into the inner region of the detection section 16.

The digital sensor 18 is configured for providing a digital signal S that assumes an alternate sequence of states (see, for example, the graph shown in FIG. 4) when the level of the liquid is between the intermediate level 12 and the reduced level 13. Each one of the states that the digital signal S assumes is either an air-indicating state s0 or a liquid-indicating state s1.

The air-indicating state s0 is assumed each time the digital sensor 18 detects, in the detection section 16, the presence of air bubbles in a flow of liquid exiting the vessel 12 through the outlet duct 14. Conversely, the liquid-indicating state s1 is assumed each time the digital sensor 18 detects, in the detection section 16, the absence of air bubbles in a flow of liquid exiting the vessel 12 through the outlet duct 14.

The apparatus 10 further comprises a control unit 20 configured for comparing the digital signal S with a reference signal S' having a predetermined frequency of air-indicating states and liquid-indicating states. The control unit 20 is also configured for modifying the duration of actuation of the pump 20 as a function of a difference existing in the comparison between the digital signal S and the reference signal S'.

In particular, the reference signal S' is obtained during a calibration step, wherein a liquid of known viscosity and known level is delivered from the vessel 12 with the pump operating at the nominal flow-rate value. During this calibration, the digital sensor 18 detects, in "ideal" operating conditions, the reference signal S' that will be compared with the digital signal S.

In this manner, if while the assembly 10 is in operation a liquid has higher viscosity than in ideal conditions, then the digital signal S will show a number of commutations greater than the number of variations in the reference signal S' and/or a total duration of the air-indicating states longer than in the reference signal S'. Therefore, the vessel 12 will be emptied more slowly than in the "ideal" operating conditions. Thus, in order to ensure complete supply of the liquid, the pump will have to be actuated for a longer duration than in the "ideal" operating conditions. Likewise, if while the assembly 10 is in operation a liquid has lower viscosity than in ideal conditions, then the digital signal S will show a number of commutations smaller than the number of variations in the reference signal S' and/or a total duration of the air-indicating states shorter than in the reference signal S'. Therefore, the vessel 12 will be emptied more quickly than in the "ideal" operating conditions. Thus, in order to ensure complete supply of the liquid, the pump will have to be actuated for a shorter duration than in the "ideal" operating conditions.

Accordingly, the present invention also provides a method for controlling the supply of a level of liquid contained in a vessel.

Figure 2:
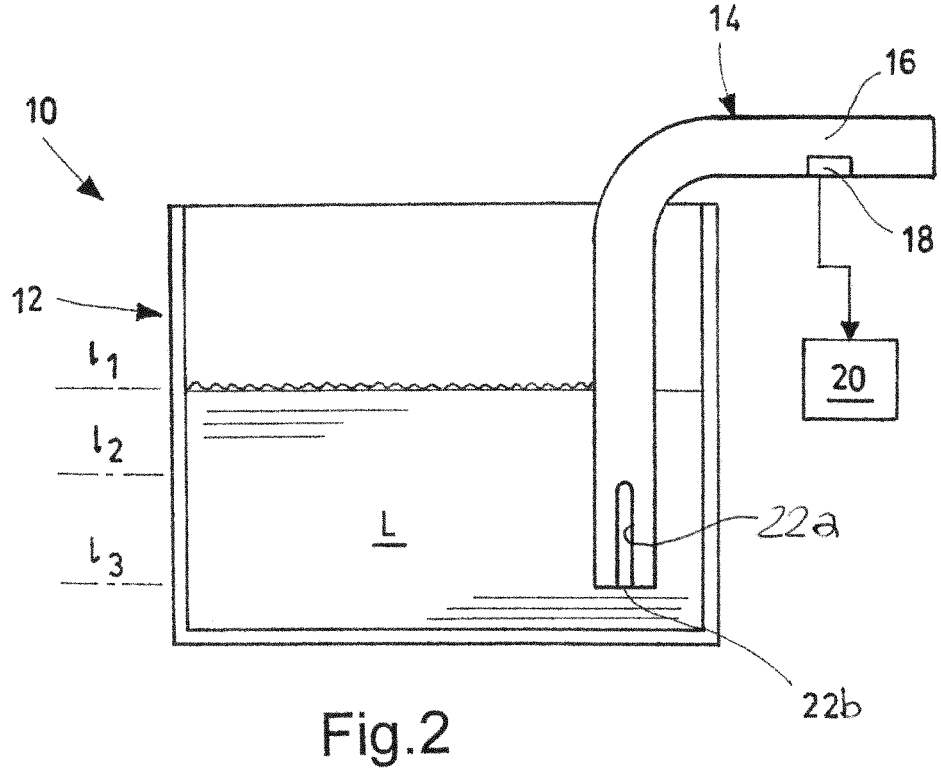
Figure 2A:
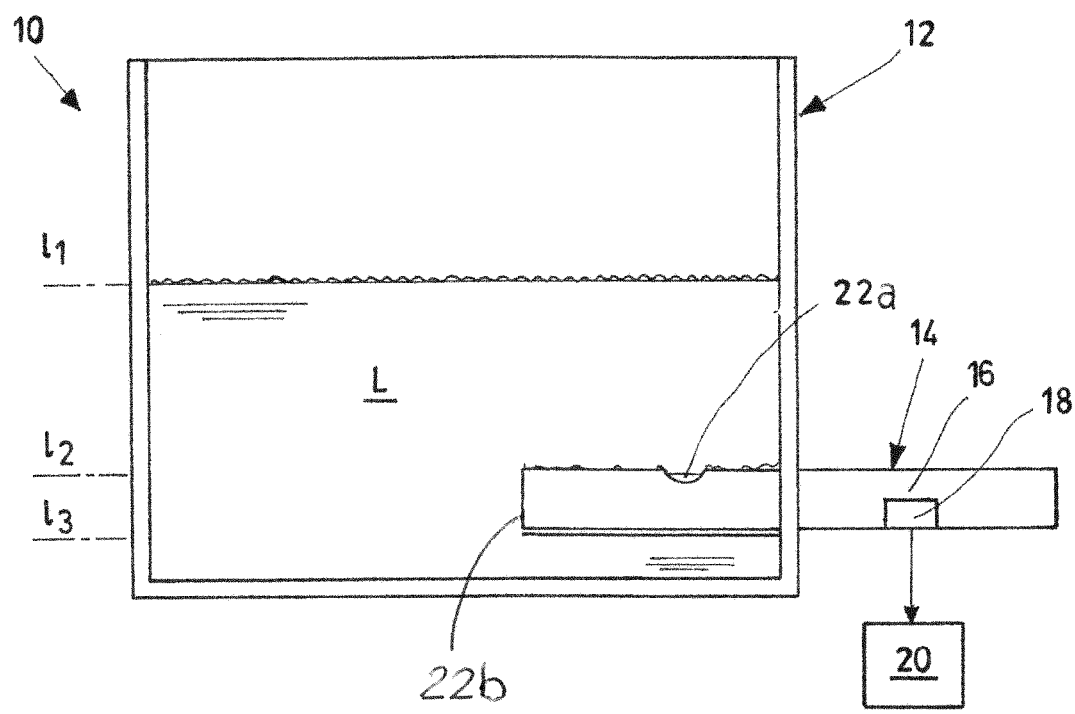

With reference to the non-limiting and merely illustrative embodiments shown in FIGS. 1, 2 and 2a, the method comprises the operating step of actuating a pump at a constant nominal flow-rate in order to induce a flow of liquid out of the vessel 12 through an outlet duct 14.

According to this method, the outlet duct 14 communicates with the vessel 12 with an upper aperture 22a, situated at a height that defines an intermediate level 12 of filling of the vessel 12. Also, the outlet duct 14 communicates with the vessel 12 with a lower aperture 22b, situated at a height that defines a reduced level 13 of filling of said vessel 12. The low level 13 is lower than the intermediate level 12.

The method then comprises the operating step of detecting the flow of liquid in a detection section 16 of the outlet duct 14, thus digitally providing a digital signal S that assumes an alternate sequence of states when the liquid level is between the intermediate level 12 and the reduced level 13.

Each one of the states assumed by the digital signal is either an air-indicating state s0 or, alternatively, a liquid-indicating state s1. In particular, the air-indicating state s0 is assumed by the digital signal S each time, at a certain time instant, the presence of air-bubbles is detected in said flow of liquid in the detection section 16. Conversely, the liquid-indicating state s1 is assumed by the digital signal S each time, at a certain time instant, the absence of air bubbles is detected in said flow of liquid in the detection section 16.

The method further comprises the step of comparing the digital signal S with a reference signal S' having a predetermined frequency of air-indicating states and liquid-indicating states. The method further comprises the step of modifying the duration of actuation of the pump as a function of a difference existing in the comparison between the digital signal S and the reference signal S'.

In the above-defined method and apparatus 10, reliable supply of the liquid is attained through a simple and economical implementation.

With particular reference to FIG. 1, in the vessel 12 the outlet duct 14 follows a substantially descending path, preferably in a substantially vertical direction.

In the embodiment shown in FIG. 1, the upper aperture 22a is an axial end hole of the outlet duct 14. Conversely, the lower aperture 22b is a transversal hole in the side surface of the outlet duct 14.

In the embodiment illustrated in FIG. 1, the substantially horizontal surface defined by the upper aperture 22a sets the intermediate level 12. Instead, the bottom edge of the substantially vertical surface defined by the lower aperture 22b sets the reduced level 13.

With particular reference to FIG. 2, in the vessel 12 the outlet duct 14 follows a substantially ascending path, preferably in a substantially vertical direction.

In the embodiment shown in FIG. 2, the upper aperture 22a is a transversally open longitudinal slot or cut-out in the side surface of the outlet duct 14. Conversely, the lower aperture 22b is an axial end hole of the outlet duct 14.

In the embodiment illustrated in FIG. 2, the top edge of the substantially vertical surface defined by the upper aperture 22a sets the intermediate level 12. Instead, the substantially horizontal surface defined by the lower aperture 22b sets the reduced level 13.

With particular reference to FIG. 2a, in the vessel the outlet duct 14 follows a substantially horizontal path.

In the embodiment shown in FIG. 2a, the upper aperture 22a is a transversally open hole in the side surface of the outlet duct 14. Conversely, the lower aperture 22b is an axial end hole of the outlet duct 14.

In the embodiment illustrated in FIG. 2a, the substantially horizontal surface defined by the upper aperture 22a sets the intermediate level 12. Instead, the bottom edge of the substantially vertical surface defined by the lower aperture 22b sets the reduced level 13.

The generation of air bubbles in the flow of liquid out of the vessel 12 is due to the behaviour of the liquid when it is between the intermediate level 12 and the reduced level 13, i.e. when the liquid is at a height between the outlet apertures 22a and 22b that hydraulically connect the vessel 12 to the outlet duct 14. As the level of the liquid decreases, the liquid contained in the vessel partially uncovers only a small section of the upper outlet aperture 22a. Thus, most of the upper outlet aperture 22a is still immersed in the liquid, and air bubbles begin to form in the liquid flowing out through the outlet duct 14. Generally the presence of air bubbles depends on the flow-rate of liquid exiting the vessel 12, the shape of the upper outlet aperture 22a, and the properties and characteristics of the liquid.

In other words, in the interval between the instant at which the level starts decreasing below the upper outlet aperture 22a and the instant at which most of the upper outlet aperture 22a becomes completely uncovered, air bubbles flow within the liquid in the outlet duct 14.

In light of the above, the following phases occur as the vessel 12 is drained.

With reference to FIGS. 1, 2 and 2a, there is an initial phase wherein the level of the liquid in the vessel 12 is at a height comprised between a high level 11 and an intermediate level 12. In this initial phase, the digital sensor 18, situated downstream of the vessel 12, is essentially only hit by liquid, without a significant presence of air bubbles (see the initial portion S1 of the digital signal S depicted in the graph shown in FIG. 4).

An intermediate, or "reserve", phase then occurs, wherein the level of the liquid in the vessel 12 is at a height comprised between the intermediate level 12 and a reduced level 13. In this intermediate phase, the digital sensor 18 is hit by liquid alternating with air bubbles (see the intermediate tract S2 of the digital signal S depicted in the graph of FIG. 4).

In a final phase, the level of the liquid in the vessel 12 is at a height below the reduced level 13. In this final phase, the digital sensor 18 will detect only air, since the "uncovered" section of the lower outlet aperture 22b will be much greater than the part still "drawing" liquid from the vessel 12 (see the final tract S3 of the digital signal S depicted in the graph of FIG. 4).

Therefore, at the beginning the digital signal S of the digital sensor 18 has an initial portion S1 with a substantially consecutive series of liquid-indicating states s1 ("high" level of the vessel 12). Subsequently, the digital sensor 18 outputs a signal S with an intermediate tract S2 having a series of commutations between liquid-indicating states s1 ("high" level of the vessel 12) and air-indicating states s0 ("low" level of the vessel 12). Finally, the digital sensor 18 outputs a substantially consecutive series of air-indicating states s0 ("low" level of the vessel 12).

Preferably, in the apparatus 10 the control unit 20 is configured for modifying the duration of actuation as a function of a difference in frequency between the digital signal S and the reference signal S'. In particular, said difference in frequency refers to the variation that can be detected in the frequency of commutation between the liquid-indicating states s1 and the air-indicating states s0 when comparing the digital signal S with the reference signal S'. In the apparatus 10, the control unit 20 is preferably configured for modifying the duration of actuation as a function of a difference in the total duration of the air-indicating states s0 in the digital signal S in comparison with the reference signal S'.

Likewise, the method preferably provides for modifying the duration of actuation as a function of a difference in frequency between the digital signal S and the reference signal S'. Preferably, the method provides for modifying the duration of actuation as a function of the total duration of the air-indicating states s0 of the digital signal S in comparison with the reference signal S'.

The intermediate phase, wherein there is a substantial alternation between bubbles and liquid, allows detecting that the level of the liquid is in a so-called "reserve region" during the emptying of the vessel 12, as a function of the frequency of the commutations of the states assumed by the signal S. Therefore, in an exemplary embodiment, the duration of actuation is increased when at least one of the difference in frequency and the difference in duration corresponds to an increased value in comparison with the reference signal S'. Vice versa, the duration of actuation is reduced when at least one of the difference in frequency and the difference in duration corresponds to a decreased value in comparison with the reference signal S'.

Preferably, the method provides for evaluating a flow-rate variation, with respect to the nominal flow-rate of the pump, in the flow of liquid exiting the vessel as a function of at least one of the difference in frequency and the difference in duration.

Being the full flow-rate known, it is possible to determine the reduced flow-rate as the vessel is being drained depending on the frequency of said commutations and on the duration thereof, through a comparison with the reference signal S'.

By knowing the nominal flow-rate of the pump and the law that governs the changes in the frequency and times of commutation between the states assumed by the digital signal S in the intermediate phase, and by making a comparison with the reference signal S' obtained with a given fluid of known viscosity, it is possible to indirectly determine the viscosity of the liquid based on the frequency and times of commutation. The ways in which the liquid contained in the vessel 12 is made to flow out should not be considered to limit the protection scope claimed herein. The shape and configuration of the outlet duct 14 as shown in the embodiments of FIGS. 1, 2 and 2a should not be deemed to limit the protection scope of the present invention. In this regard, the outlet duct 14 may be, without distinction, ascending or descending. Furthermore, the outlet duct 14 (as well as the detection tract 16 afferent thereto) may be arranged horizontally, vertically, or inclined relative to the level of the liquid contained in the vessel 12.

Also, there may be a single outlet aperture 22 or differently shaped apertures or cut-outs, or small holes.

The digital sensor 18 may be of any known type. According to the exemplary embodiment shown in FIG. 3, the digital sensor 18 is an optical unit, e.g. as described in international patent application publication no. WO 2010/109414 A2. In particular, in the illustrated example the digital sensor 18 comprises an optical structure, such as a prism 114, at least partially facing into the inner region of the detection tract 16 and including an emitter 116, e.g. a LED, and a receiver 118, e.g. a photodiode or a phototransistor. The emitter 116 and the receiver 118 face towards a set of surfaces of the prism 114 that can prevalently reflect (dashed line) or prevalently refract (dashed-dotted line) an incident light beam, depending on whether air bubbles are present or substantially absent, respectively, in the liquid flowing through the detection tract 16. The emitter 116 is adapted to send a radiation beam towards the prism 114. The receiver 118 is adapted to receive the radiation beam coming from the emitter 116 and prevalently reflected by the prism 114 when the liquid flowing through the detection tract 16 contains an air bubble (which represents the air-indicating state of the digital signal). Conversely, the receiver 118 will not receive the radiation beam coming from the emitter 116, which will be prevalently refracted by the prism 114, when the liquid flowing through the detection tract 16 contains no air bubbles (which represents the liquid-indicating state of the digital signal).

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A method for controlling a supply of a level of a liquid contained in a vessel; said method comprising the following operating steps:

actuating a pump at a constant nominal flow-rate to induce a flow of liquid out of said vessel through an outlet duct communicating with said vessel; said vessel including:
  an upper aperture situated at a first height that defines an intermediate level of filling of said vessel, and
  a lower aperture situated at a second height that defines a reduced level of filling of said vessel, lower than said intermediate level;

detecting said flow of liquid in a detection section of said outlet duct, providing a digital signal that assumes an alternate sequence of states when the level of the liquid is between said intermediate level and said reduced level, wherein each one of said states is:

an air-indicating state wherein in said detection section, presence of air bubbles is detected in said flow of liquid, and, a liquid-indicating state wherein in said detection section, absence of air bubbles is detected in said flow of liquid;

comparing said digital signal with a reference signal having a predetermined sequence of air-indicating states and liquid-indicating states; and modifying a duration of actuation of said pump as a function of a difference in the comparison between said digital signal and said reference signal.

2. The method according to claim 1, wherein said duration of actuation is changed as a function of at least one of:
a difference in frequency between said digital signal and said reference signal, and
a difference in total duration of the air-indicating states between said digital signal and said reference signal.

3. The method according to claim 2, wherein said duration of actuation is increased when at least one of said difference in frequency and said difference in total duration corresponds to an increased value in comparison with said reference signal.

4. The method according to claim 2, wherein said duration of actuation is reduced when at least one of said difference in frequency and said difference in total duration corresponds to a decreased value in comparison with said reference signal.

5. The method according to claim 2, wherein a flow-rate variation is evaluated, with respect to said nominal flow-rate, in the flow of liquid exiting said vessel as a function of at least one of said difference in frequency and said difference in total duration.

6. An apparatus for measuring a level of a liquid contained in a vessel, comprising:
a vessel adapted to contain a quantity of liquid;
an outlet duct extending from said vessel and including a detection section, said outlet duct communicating with said vessel; said vessel including:
an upper aperture situated at a first height defining an intermediate level of filling of said vessel, and
a lower aperture situated at a second height defining a reduced level of filling of said vessel, lower than said intermediate level;
a pump actuatable at a constant nominal flow-rate to induce a flow of liquid out of said vessel through said outlet duct;
a digital sensor (18) at least partially facing into the inner region of said detection section, and configured for providing a digital signal; the digital signal assuming an alternate sequence of states when the level of the liquid is between said intermediate level and said reduced level, each one of said states being as follows:
an air-indicating state wherein said digital sensor detects, in said detection section, a presence of air bubbles in a flow of liquid coming out from said vessel through said outlet duct, and,
a liquid-indicating state wherein said digital sensor detects, in said detection section, an absence of air bubbles in a flow of liquid coming out of said vessel through said outlet duct;
a control unit configured for:
comparing said digital signal with a reference signal having a predetermined sequence of air-indicating states and liquid-indicating states, and
modifying a duration of actuation of said pump as a function of a difference in the comparison between said digital signal and said reference signal.

7. The apparatus according to claim 6, wherein said control unit (20) is configured for modifying said duration of actuation as a function of at least one of:
a difference in frequency between said digital signal and said reference signal, and
a difference in total duration of the air-indicating states between said digital signal and said reference signal.

8. The apparatus according to claim 7, wherein said control unit is configured for increasing said duration of actuation when at least one of said difference in frequency and said difference in total duration corresponds to an increased value in comparison with said reference signal.

9. The apparatus according to claim 7, wherein said control unit is configured for reducing said duration of actuation when at least one of said difference in frequency and said difference in total duration corresponds to a decreased value in comparison with said reference signal.

10. The apparatus according to claim 7, wherein said control unit is configured for evaluating a flow-rate variation, with respect to said nominal flow-rate, in the flow of liquid exiting said vessel as a function of at least one of said difference in frequency and said difference in total duration.

11. The apparatus according to claim 6, wherein the apparatus is configured for operation in a household appliance.

* * * * *